United States Patent [19]

Zampini et al.

[11] Patent Number: 5,394,477
[45] Date of Patent: * Feb. 28, 1995

[54] MICROPROCESSOR CONTROLLED MULTIPLE CHANNEL VTR CONFIGURATION OF AN AUDIO FOLLOW VIDEO MIXER

[75] Inventors: Michael A. Zampini; Alan Flum, both of Boca Raton, Fla.

[73] Assignee: Sony Electronics Inc., Park Ridge, N.J.

[*] Notice: The portion of the term of this patent subsequent to Jul. 20, 2010 has been disclaimed.

[21] Appl. No.: 45,605

[22] Filed: Apr. 9, 1993

[51] Int. Cl.⁶ .......................... H04B 1/00; H04B 3/00; H02B 1/00
[52] U.S. Cl. ............................. 381/119; 381/81; 381/123
[58] Field of Search .................. 381/119, 81, 85, 107, 381/123, 77, 80

[56] References Cited

U.S. PATENT DOCUMENTS

| | | |
|---|---|---|
| 4,281,314 | 7/1981 | Hunt . |
| 4,521,870 | 6/1985 | Babbel et al. . |
| 4,635,288 | 1/1987 | Stadius . |
| 4,764,812 | 8/1988 | Hamley . |
| 4,792,974 | 12/1988 | Chace . |
| 4,879,751 | 11/1989 | Franks et al. . |
| 4,885,792 | 12/1989 | Christensen et al. . |
| 4,907,085 | 3/1990 | Bingham . |
| 4,993,073 | 2/1991 | Sparkes ............................ 381/119 |
| 5,175,771 | 12/1992 | Zampini et al. .................... 381/119 |
| 5,230,024 | 7/1993 | Zampini et al. . |

*Primary Examiner*—Curtis Kuntz
*Assistant Examiner*—Ping W. Lee
*Attorney, Agent, or Firm*—Ronald P. Kananen

[57] ABSTRACT

An audio mixer system using a serial editor interface is disclosed. Use of a microprocessor control circuit is disclosed to control various functions a plurality of multiple channel VTRs under the control of a mixer. Serial control signals are supplied from a video editor to a serial interface which includes a microprocessor. These control signals are decoded, and the appropriate controls of the VTRs are implemented. These controls include crossfading as well as PREVIEW/REVIEW monitoring.

15 Claims, 25 Drawing Sheets

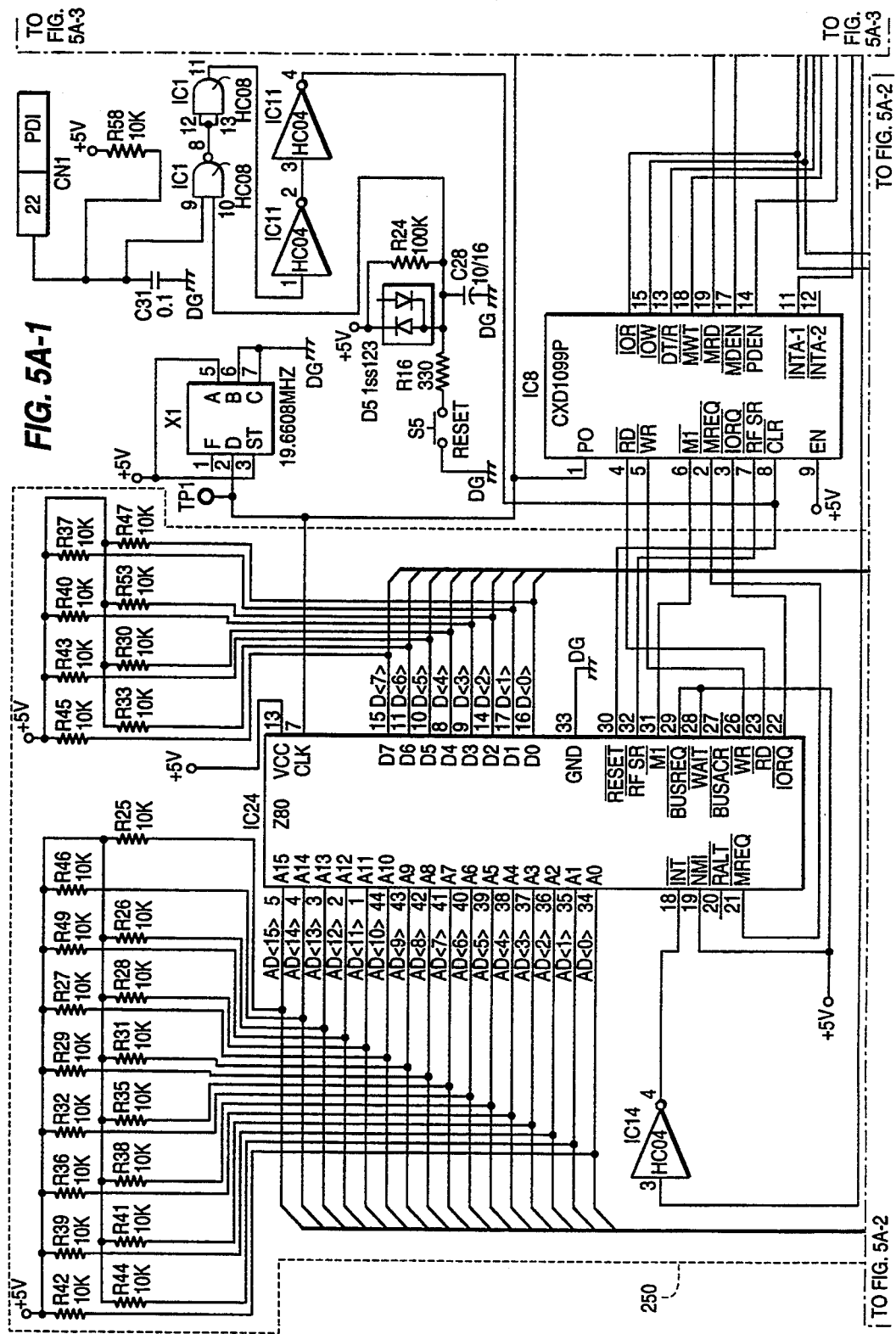

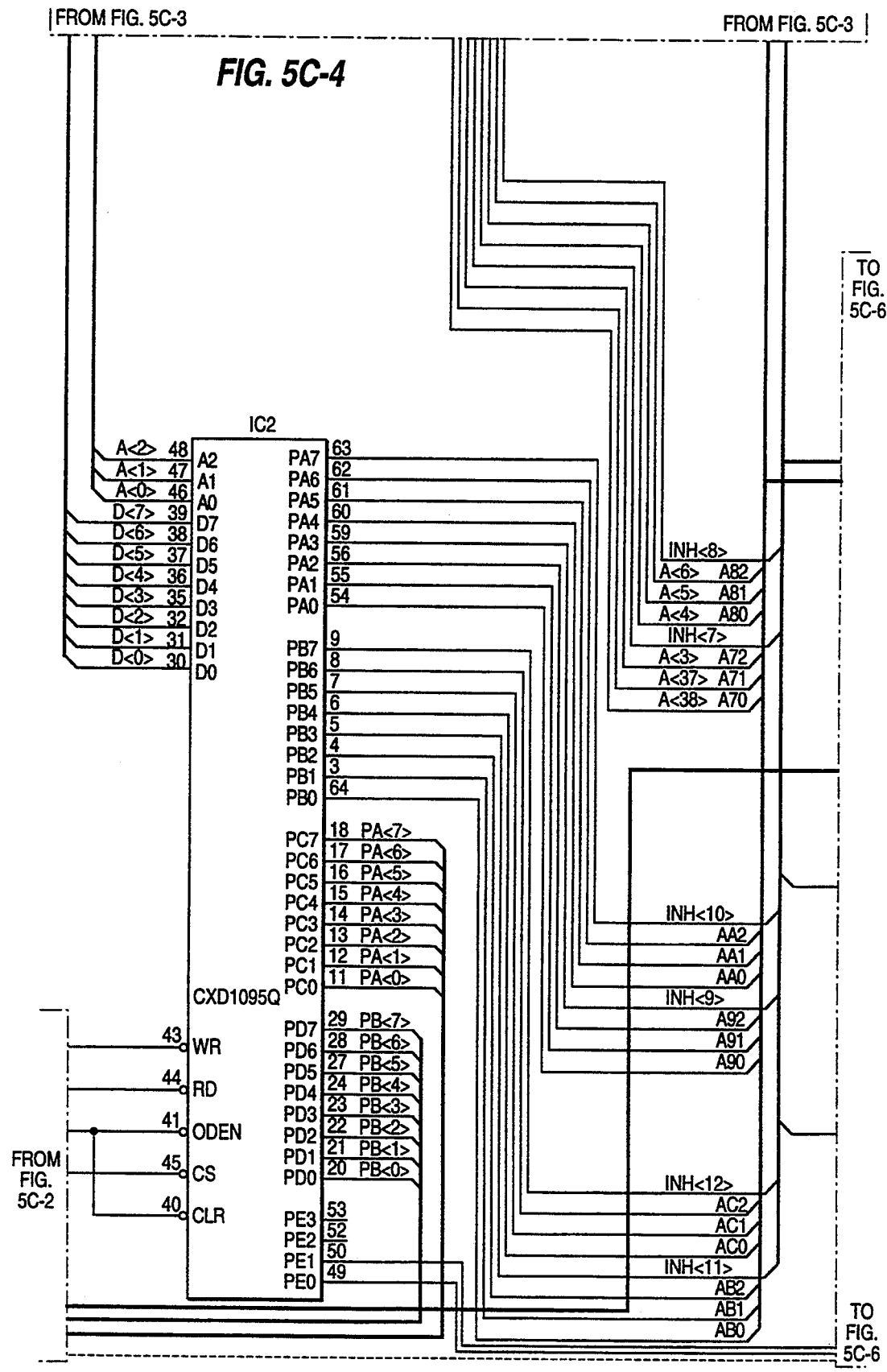

FIG. 6

VTR CONFIGURATION CHART

MICROPROCESSOR CONTROLLED MULTIPLE CHANNEL VTR CONFIGURATION OF AN AUDIO FOLLOW VIDEO MIXER

FIELD OF THE INVENTION

This invention relates to an audio follow video mixer under control of an editor through a serial interface which includes a microprocessor to control various functions of two and four-channel VTRs or other multi-channel devices operatively coupled to the mixer. More particularly, this invention relates to such a mixer for mixing signals from a plurality of devices, such as VTRs, arranged in a predetermined configuration of devices respectively having a first and a second number of channels. Still more particularly, this invention relates to such a device with a serial interface wherein the microprocessor controls the crossfading of signals and PREVIEW/REVIEW functions between selected pairs of devices.

BACKGROUND OF THE INVENTION

In order to accomplish audio editing, it is known to use a mixer to control a plurality of multi-channel devices, such as VTRs, for example. It is also known that an editor may be advantageously used to control the mixer via an editor interface to enable various VTR functions including PREVIEW/REVIEW and FADE UP/DOWN, for example. Accordingly, control signals can be sent from an editor to the mixer in order to preview audio signals at an edit-in point on a recording medium of a recorder VTR. Similarly, control signals may be sent from an editor in order to review audio signals output from a recorder VTR. In general, the PREVIEW/REVIEW functions require a digital signal (e.g. to be supplied to an appropriate channel) to activate the channel.

The FADE UP/DOWN functions generally require analog signals to be supplied to the appropriate channels. These signals are commonly referred to as VCA signals and are supplied to voltage controlled amplifiers associated with the channels. Other analog and digital control signals may be used to implement other known functions.

Generally, in a mixer system, a mixer is connected to a plurality of devices such as VTRs or other multi-channel devices, for example. The mixer may also be connected to an editor via an editor interface to enable editor control of the mixer. The editor interface may comprise either a parallel interface or a serial interface. Editor interfaces of the latter type offer several advantages. Primarily, however serial interfaces are advantageous in that they require fewer connections between the mixer and the editor.

Several drawbacks are found in prior art mixer systems used for audio editing. For example, prior systems generally enable editor control of either only all four-channel devices or only all two-channel devices. This is clearly an undesirable limitation. Some systems allow for the use of hard-wired jumpers to enable various combinations of two and four-channel devices to be used. This avoids the aforedescribed undesirable limitation, but adds a new drawback in that using hard wired jumpers is time consuming and can be difficult if several devices are to be connected. Additionally, if it is desired to reconfigure the devices, for example, to replace a four-channel device with 2 two-channel devices, rewiring is necessary, once again requiring a time consuming operation.

The system disclosed in U.S. Pat. No. 5,175,771 provides a solution to this drawback, offering a more convenient method to configure different combinations of two or four-channel VTRs without hard-wiring. This method utilizes a parallel interface between the editor and the audio mixer and a configuration selector to selected a desired configuration of a plurality of multi-channel devices to enable the convenient mixing of such various configurations. One way of achieving such configuration selection is through the use of an output of the configuration selector provided to a memory to select prestored commands to be provided to appropriate channels. In another embodiment there disclosed, the configuration selection signals are decoded and supplied to multiplexers in combination with editor control signals through a parallel interface to enable the editor control signals to be routed to appropriate channels.

However, there remains a need to provide a method of controlling a mixing of audio channels input from a selected configuration of multichannel VTRs with an editor through a serial interface. There is a further need to incorporate into a mixer system the advantages of serial interfacing.

SUMMARY OF THE INVENTION

It is thus an overall object of this invention to overcome these and other needs.

It is another object of the invention to provide a mixer connected to an editor through a serial interface which includes a microprocessor for controlling the functions of multiple channel devices arranged in a predetermined configuration through an editor.

It is a further object of this invention to provide a mixer connected to an editor through a serial interface which enables control of FADE UP/DOWN VTR functions, as well as PREVIEW/REVIEW functions.

It is a further object of this invention to provide a user with clear indications of the functions performed, or to be performed, by a mixer controlling a preselected configuration of VTRs.

These and other objects of the invention are accomplished in the following manner.

An audio mixer system is disclosed comprising audio mixer means for mixing audio signals from a plurality of devices arranged in a predetermined configuration of devices having a first number of channels and a second number of channels, an editor operatively connected with the audio mixer means for supplying editor control signals to the audio mixer, and interfacing means operatively connected with the audio mixer means for controlling the audio mixer means with the editor control signals. The interfacing means include microprocessor control means for controlling the mixing of the audio signals from the plurality of devices according to the editor control signals. Preferably, the interfacing means is a serial editor control means.

According to one embodiment of the invention, the interfacing means controls the audio mixer means with serial data transmitted between the audio mixer means and the editor which cooperates with a configuration selector to enable a selection of a desired configuration of the outputs of the devices to be mixed.

According to a second embodiment of the invention, the interfacing means includes a communications integrated circuit, volatile memory means for storing control signals, and nonvolatile memory means for storing instruction signals.

According to a third embodiment of the invention, the plurality of devices comprise multiple channel VTRs arranged in a predetermined configuration of devices having a first number of channels and a second number of channels.

According to a fourth embodiment of the invention, the microprocessor control means controls the crossfading of signals and PREVIEW/REVIEW functions between selected pairs of said multiple channel VTRs, as selected from the predetermined configuration of such devices.

These and other features of this invention will become apparent from a review of the specification which follows.

BRIEF DESCRIPTION OF THE DRAWINGS

FIGS. 5A-1, 5A-2, 5A-3, 5A-4, 5A-5, 5A-6, 5B-1, 5B-2, 5B-3, 5C-1, 5C-3, 5C-4, 5C-5, 5C-6, 5C-7, 5D-1, 5D-2, 5D-3 and 5D-4 collectively are a detailed schematic diagram illustrating the mixer system according to a preferred embodiment of the present invention.

FIG. 6 is a VTR configuration chart illustrating various configurations of two and four-channel VTRs and a corresponding Mode number for each configuration.

DETAILED DESCRIPTION OF THE PREFERRED EMBODIMENT

Figure 1:
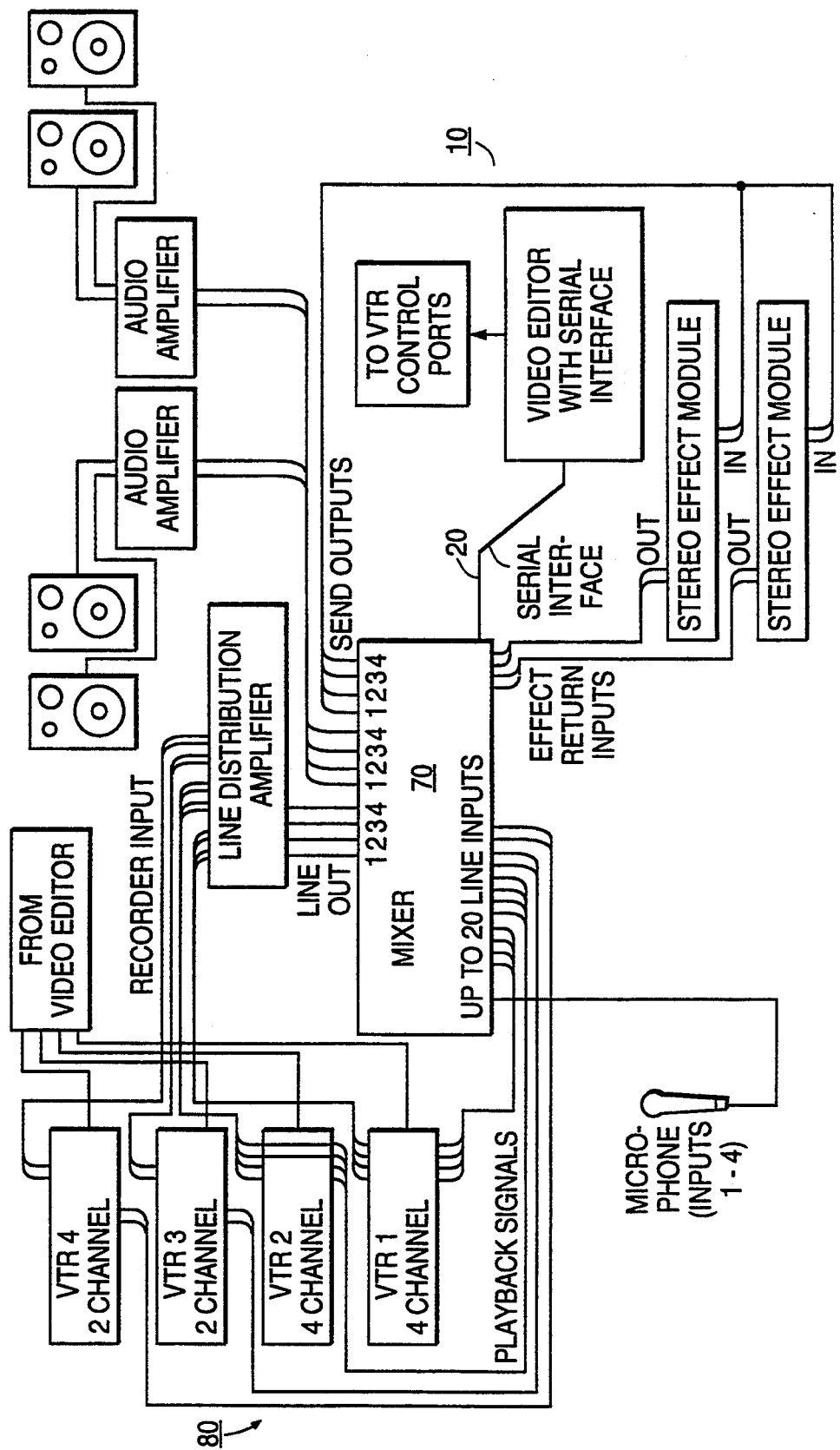
FIG. 1 is a representation of a mixer system according to the present invention.

FIG. 1 is a representation of a mixer system according to the present invention as used in a typical application. The system of FIG. 1 includes an editor 10 connected through a serial editor interface 20 to a mixer 70, which in turn is connected to a plurality of devices arranged in a predetermined configuration to be controlled by the editor, e.g., a plurality of multi-channel VTRs 80. For convenience only, the following description will refer to VTRs, but it is to be understood that the invention is not so limited. Other devices, including other multi-channel devices, may be used with this invention. Reference may also be made to U.S. Pat. No. 5,175,771 for the details of a similar system using a parallel interface, the disclosure of which is herein incorporated by reference.

As shown in FIG. 1, the editor 10 controls the VTRs 80 according to the signals from the video editor supplied to a serial interface 20. The mixer 70 may be constrained to a single configuration of VTRs of only one type, such as all two-channel. However, as illustrated, some of the VTRs 80 may be of the two-channel type and some may be of the four-channel type. In such a case where the mixer 70 provides the flexibility of using multiple configurations of VTRs, it becomes necessary for editor control operations to know which particular combination of two and four-channel VTRs is being used. A convenient method of satisfying such a need is shown in FIG. 2.

Figure 2:
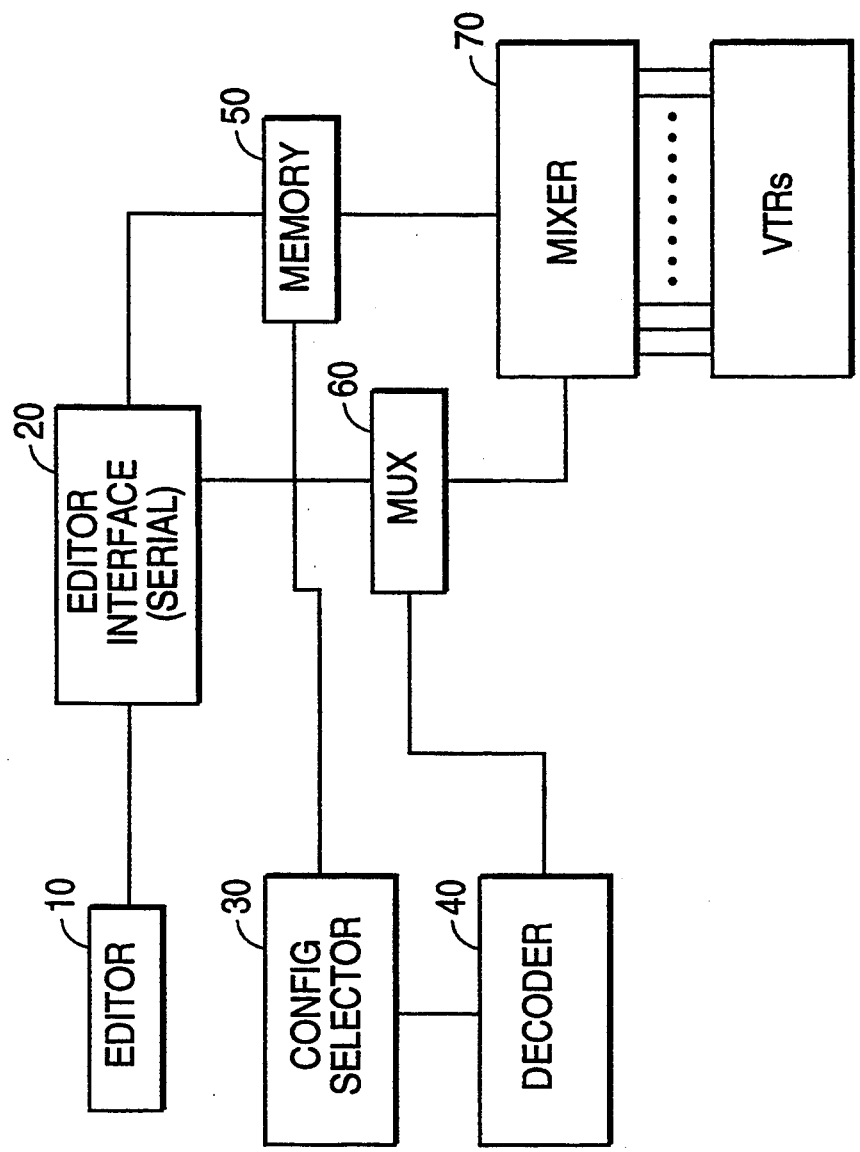
FIG. 2 is a simplified block diagram illustrating a mixer system which incorporates a flexible way to configure a plurality of multiple channel VTRs (for use in conjunction with the present invention).

According to the method as shown in FIG. 2, there is provided a configuration selector 30 for selecting a desired configuration of VTRs from a number of preprogrammed configurations. The output of the configuration selector 30 is provided to a decoder 40 so that the output can be decoded in a known manner to generate a signal corresponding to the selected configuration. The output of the decoder is then applied to a multiplexer 60 which may then supply signals, e.g., VCA signals, to selected channels of the mixer 70 associated with the VTRs 80 according to control signals provided by the editor 10.

The editor 10 issues commands and control signals which are transmitted to the mixer 70 through a serial interface. As shown, the editor 10 supplies serial input signals to the serial interface along a connecting line 15o Serial output signals from the interface 20 to the editor 10 are also supplied along the connecting line 15 which may comprise, for example, two wires for input and output.

According to one embodiment of the present invention (shown in FIG. 3) a serial interface 20 includes a circuit 210 for converting serial data to parallel data. This data is then supplied to a microprocessor control circuit 230 which in turn controls various functions of the mixer through a signal line 25. The signal line 25 may comprise a plurality of data and address buses (not shown). The serial interface 20 also includes read only memory 240 for controlling the microprocessor 230, as well as random access memory 220. Also provided in this embodiment is an address decoder means 250 used in routing control signals from the editor 10 to various implementing circuits described below.

This embodiment may be utilized to implement any of a number of functions of a mixer and related devices such as VTRs. Specific examples of such functions are described in detail below, however, the invention is not limited to such examples. Other functions will be readily apparent to those skilled in the art.

According to the embodiment shown, there is included mode select means 320 which may comprise a switch which is used to enable editor control of the mixer. The mode select means is coupled along signal line 25 to mode indicator means 310 which indicates on the mixer display the state of the mixer, i.e., whether it is under local control or under control of the editor 10.

In the example shown, the microprocessor control circuit 230 controls several mixer functions such as crossfade and REVIEW/PREVIEW. Crossfade is controlled through a crossfade start circuit 410, a crossfade duration control circuit 430, a crossfade curve select circuit 440 and a crossfade control circuit 450. The crossfade operation is indicated by a crossfade indicator circuit 420.

The editor 10 may be used to implement a crossfade with the mixer between two selected VTRs. Accordingly, the editor 10 supplies serial control signals to the serial interface 20 indicating which VTRs should be active for purposes of the crossfade. These signals are converted to parallel data with a communications integrated circuit included in the serial to parallel converter circuit 210. This data is then decoded by the microprocessor 230 and the appropriate VTR channels in the mixer are activated through the VTR configuration select circuit 330.

The editor sets the duration of the crossfade in a similar manner through the microprocessor 230 and the crossfade duration control circuit 430. The crossfade may be implemented in different manners, for example, more abruptly, through control of the crossfade curve select circuit 440.

Once these parameters have been selected, the editor sends a crossfade start signal through line 17 to the crossfade start means 410 which in turn initiates the crossfade control circuit via the microprocessor 230. The status of the crossfade operation is indicated through the crossfade indicator circuit 420.

The PREVIEW/REVIEW functions are implemented in a similar manner. That is, the editor 10 transmits serial control signals to the serial interface which are converted to parallel format. The data then initiates control of the preview output circuit 510 or the review signal output circuit 520. If a PREVIEW is indicated, an appropriate line out, i.e., an output line coupled to a selected VTR, is routed to the monitor output means 530, which may include a monitor preview bus coupled to a monitor output terminal (not shown). If a REVIEW is indicated, the mixer input coupled to a selected recorder VTR is monitored via the monitor output means 530.

Moreover, according to this embodiment, editor control of the mixer may be set directly on the mixer through mode select means 320. For example, a switch may be used to activate an EDIT mode (control of mixer functions by an editor 10) or a MANUAL mode (control of the mixer directly through a mixer display panel). The status of the mixer, i.e., whether an EDIT mode is enabled, is indicated by a mode indicator circuit 310.

Figure 3:
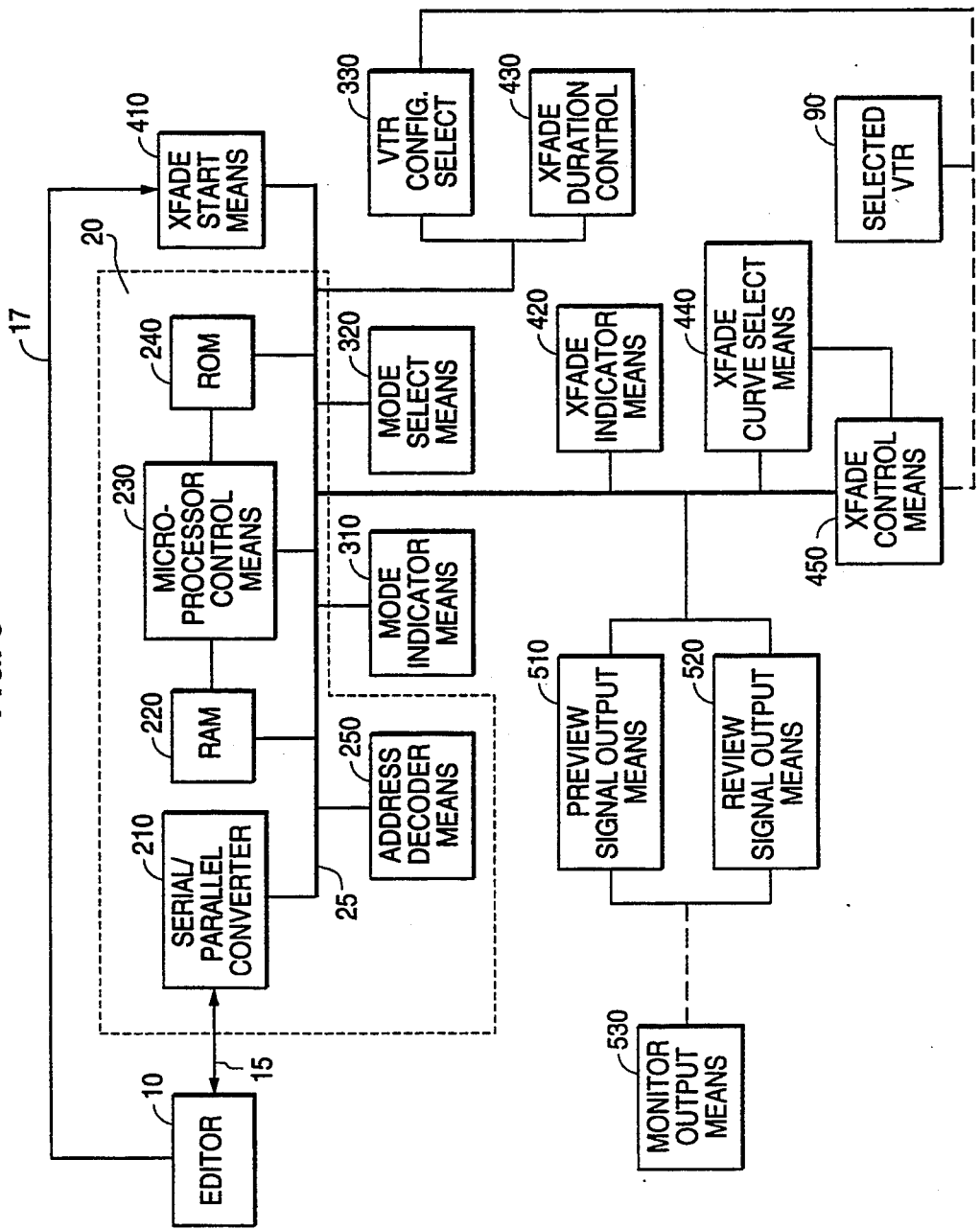
FIG. 3 is a block diagram illustrating one embodiment of the present invention.
Figure 4:
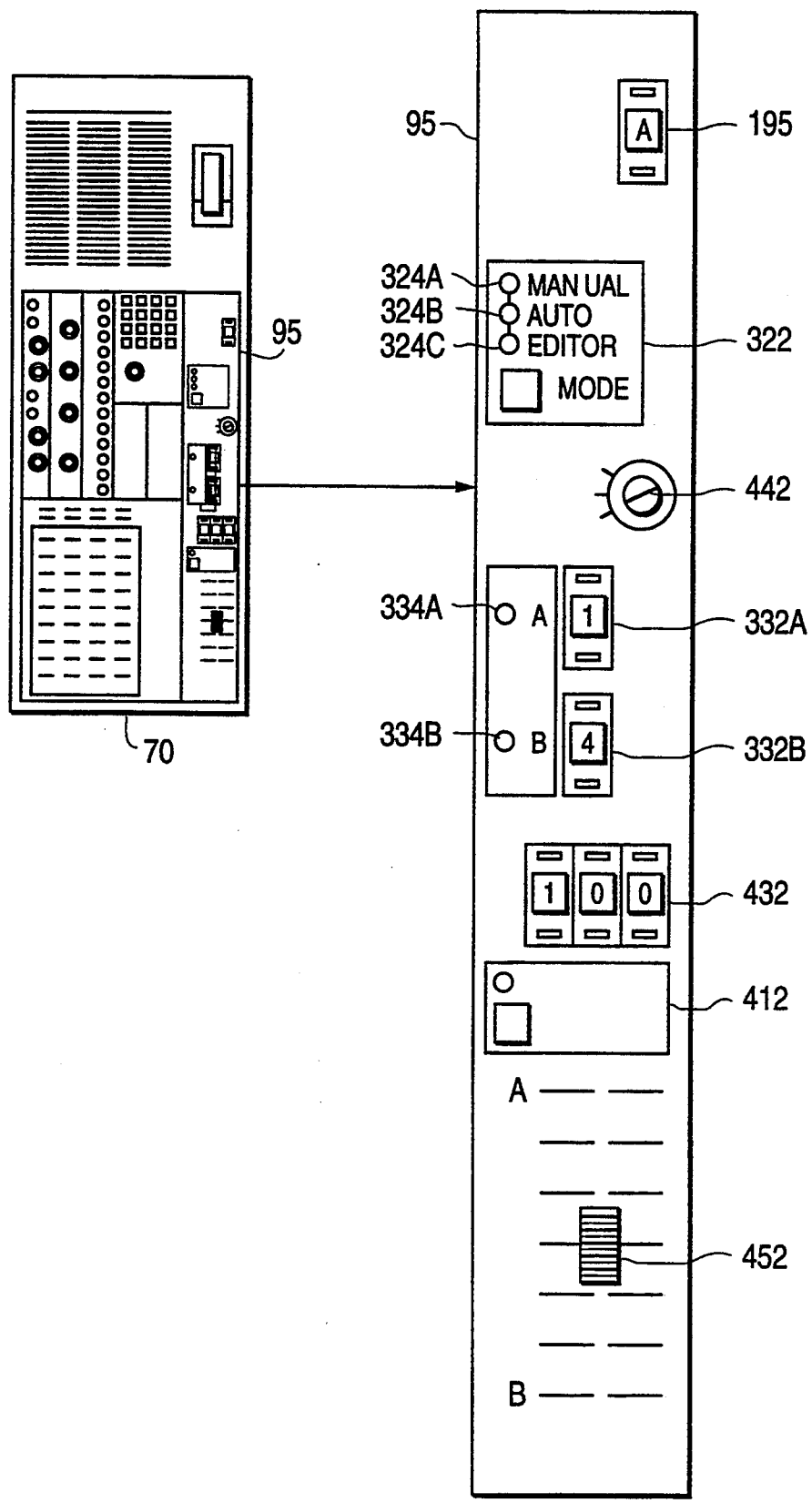
FIG. 4 is a detailed illustration of an example of the various indicator means and select means of the embodiment of FIG. 3.

Elements of some of the various indicator means and select means of FIG. 3 are illustrated in FIG. 4. As shown, a mixer 70 includes a serial interface display portion 95. On this display portion is included a VTR configuration switch 195. This switch is used to input the configuration of multiple channel VTRs connected to the mixer 70 in the manner discussed above. Accordingly, the configuration select circuit 330 of FIG. 3 includes the VTR configuration switch 195 on the serial interface panel 95.

Also located on the serial interface panel 95 is a mode select switch 322 and LED mode indicators 324A, 324B, and 324C. When lit, mode indicators 324A, 324B, and 324C indicate respectively that the editor is in MANUAL, AUTO, or EDIT mode. The mode select switch 322 and the LED mode indicators 324A, 324B, and 324C are coupled to the serial interface as shown in FIG. 3 as represented by the mode select means 320 and the mode indicator means 310.

The serial interface panel 95 further includes a fade switch 442 which provides a means of indicating which of three curve shapes to be utilized during a crossfade, as described above. The fade switch 442 is coupled to the serial interface 20 as represented by the crossfade curve select circuit 440 shown in FIG. 3.

The remaining switches and indicators on the serial display panel may be used when the mixer is not under control of an editor, i.e., not in EDITOR mode. Thus, the VTR configuration select circuit 330 (FIG. 3) is coupled to the VTR crossfade indicator switches 332A and 332B and LED VTR crossfade indicators 334A and 334B. The switches 332A and 332B may be used to select two VTRs for crossfading when VTR selection is not performed by an editor. The LED VTR crossfade indicators 334A and 334B may be used to indicate the status of a selected VTR when the mixer is not in EDITOR mode. For example, when unlit, a VTR crossfade indicator may indicate that a crossfade will originate from a selected VTR or, in another state, indicate that a crossfade will cross to a selected VTR. Finally, switches 432A, 432B and 432C may be used to manually select the duration of an automatic crossfade; switch 412 may be used to initiate an automatic crossfade; and fader 452 may be used to manually perform a crossfade between selected VTRs.

A preferred circuit layout for implementing this embodiment is presented in FIGS. 5A-1, 5A-2, 5A-3, 5A-4, 5A-5, 5A-6, 5B-1, 5B-2, 5B-3, 5C-1, 5C-2, 5C-3, 5C-4, 5C-5, 5C-6, 5C-7, 5D-1, 5D-2, 5D-3 and 5D-4 the operation of which will be readily apparent to one of ordinary skill in the art in connection with the description contained herein. Reference numerals appearing in this schematic correspond to those described in connection with FIGS. 3 and 4.

As shown in FIGS. 5A-1 to 5A-6, serial input signals from the editor are provided to the serial interface 220. This serial data is provided to a communications integrated circuit (IC) 210 which converts the serial data into parallel data comprising address bits and data bits. The data is then provided to the microprocessor control means 230 including interrupt control IC 232 and clock control IC 233. The microprocessor 230 is coupled to random access memory 220 and read only memory 240. In the example shown, ROM 240 comprises an electrically programmable read only memory (EPROM). Data from the communications IC 210 is further provided to an error checking circuit 212, as well as to address decoding circuits 250.

Figures 2, 5A:
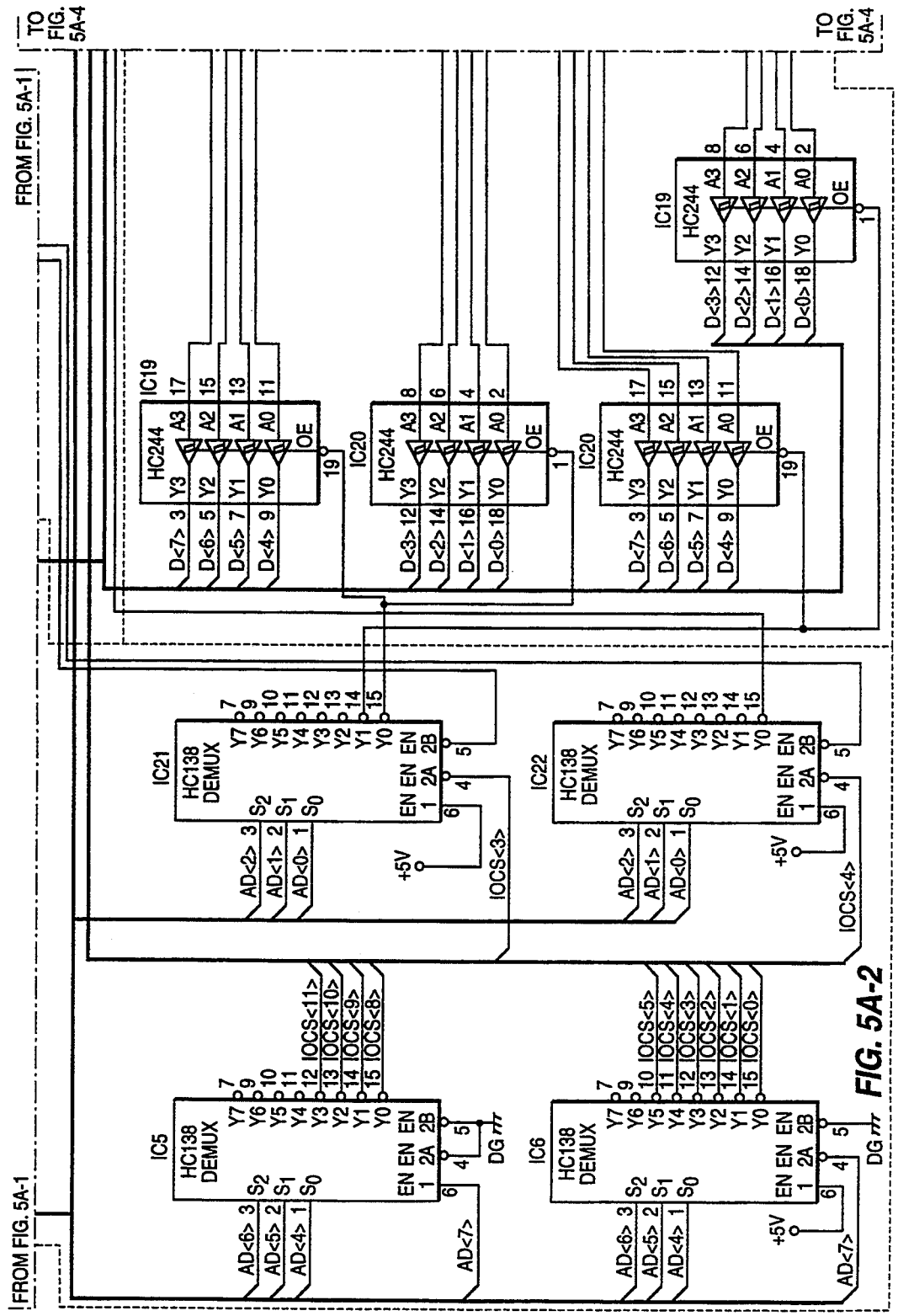
Figures 3, 5A:
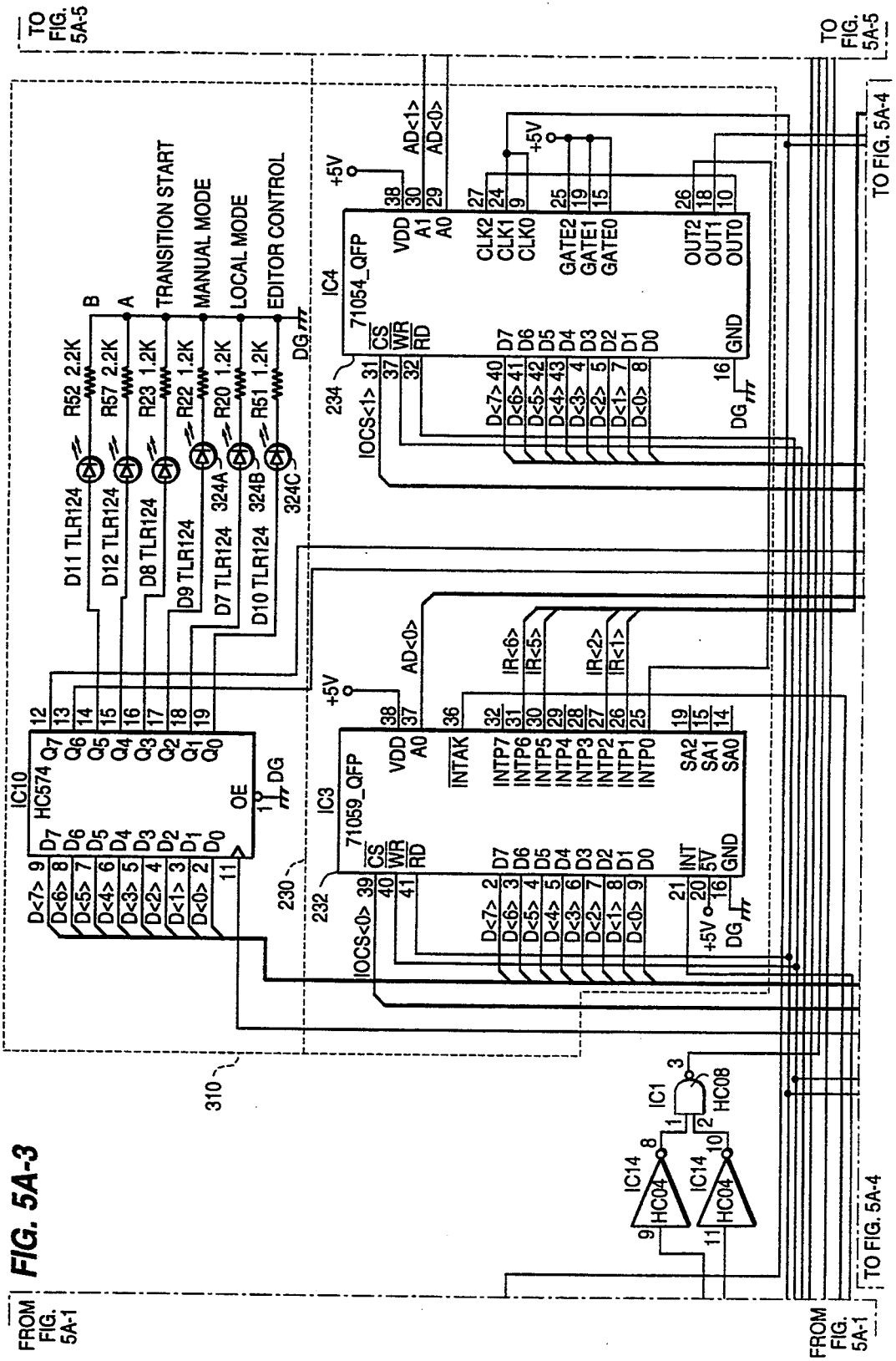
Figures 4, 5A:
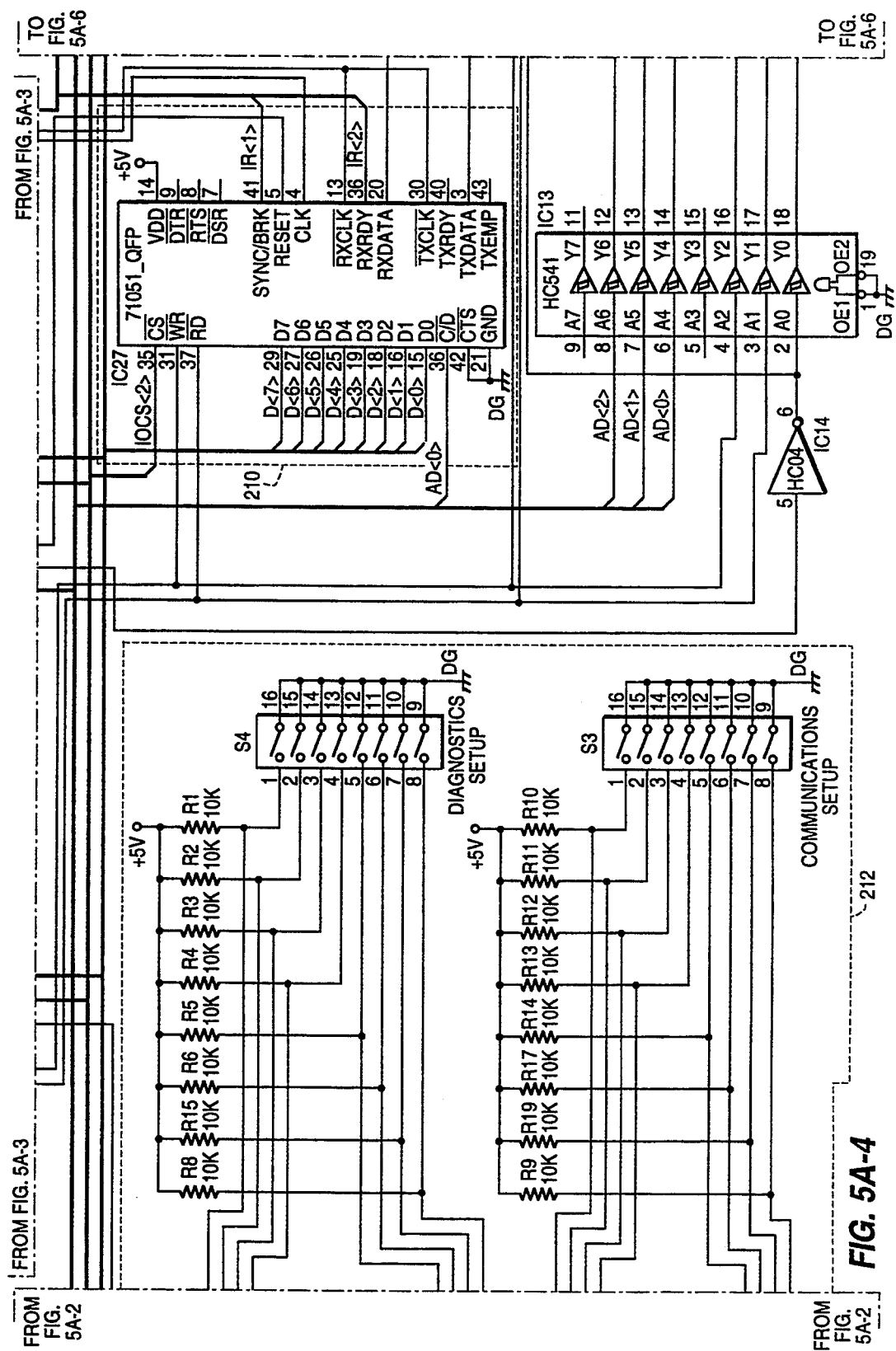
Figures 5, 5A:
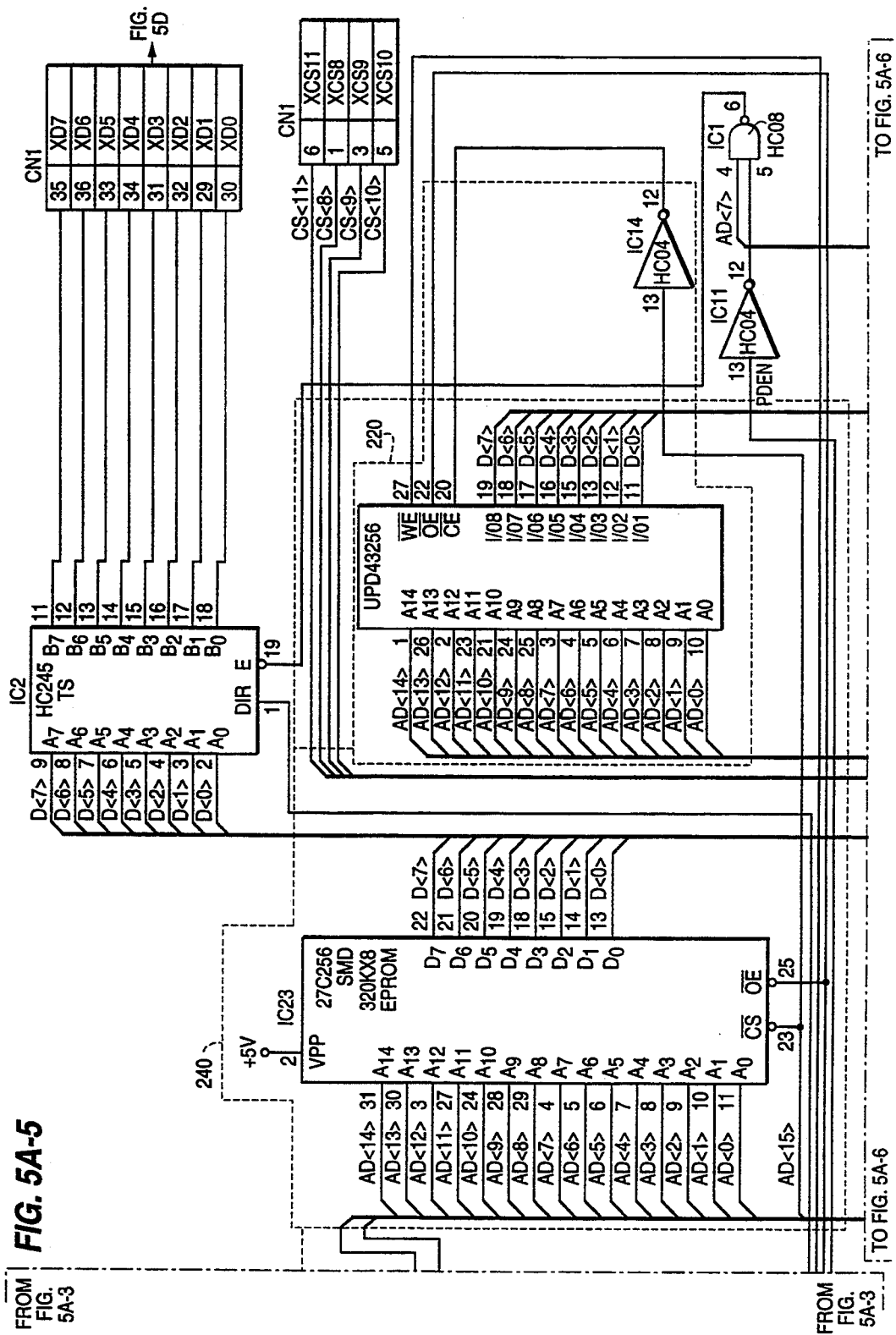
Figures 5, 5A, 6:
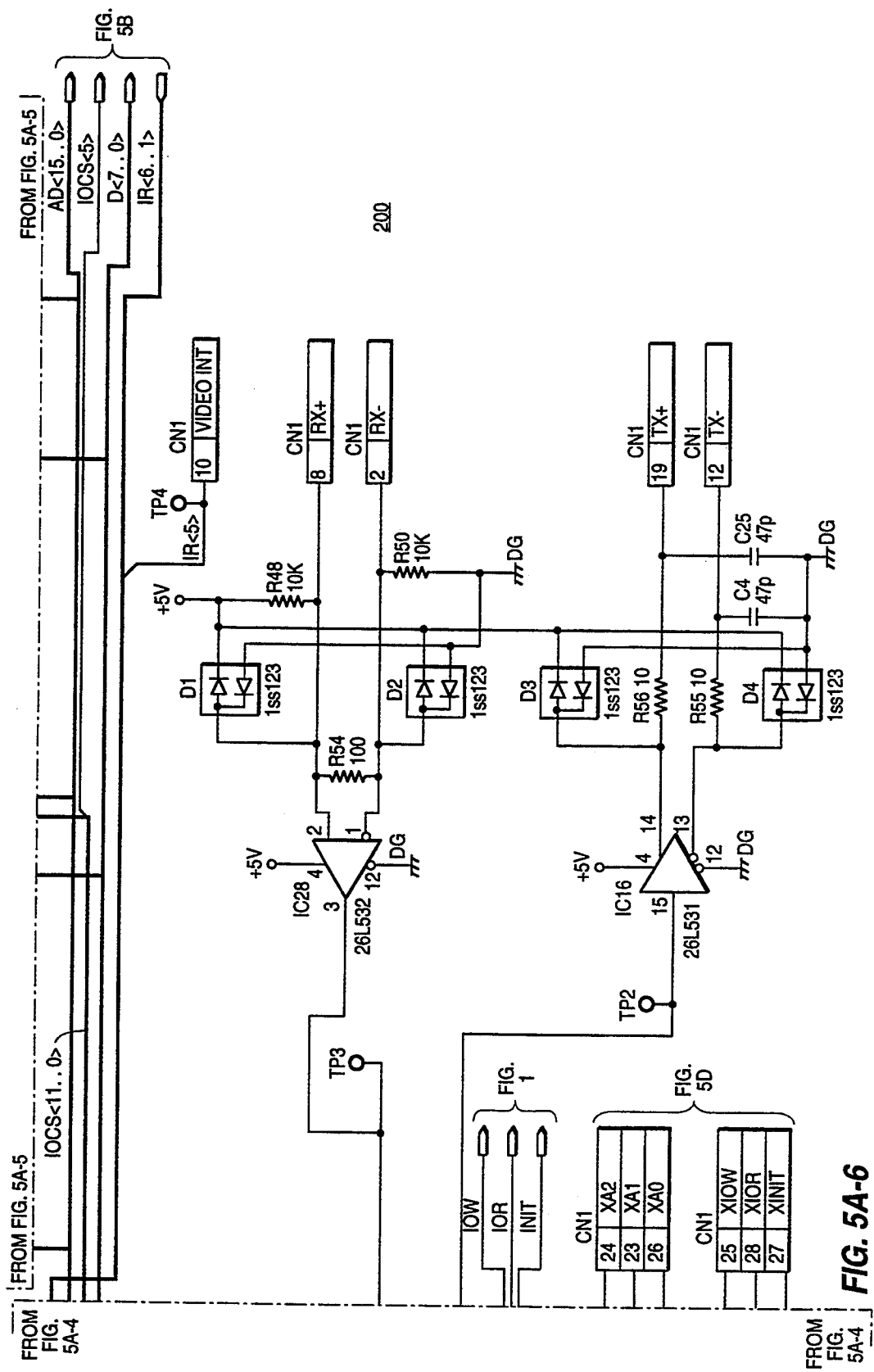
Figures 1, 5B:
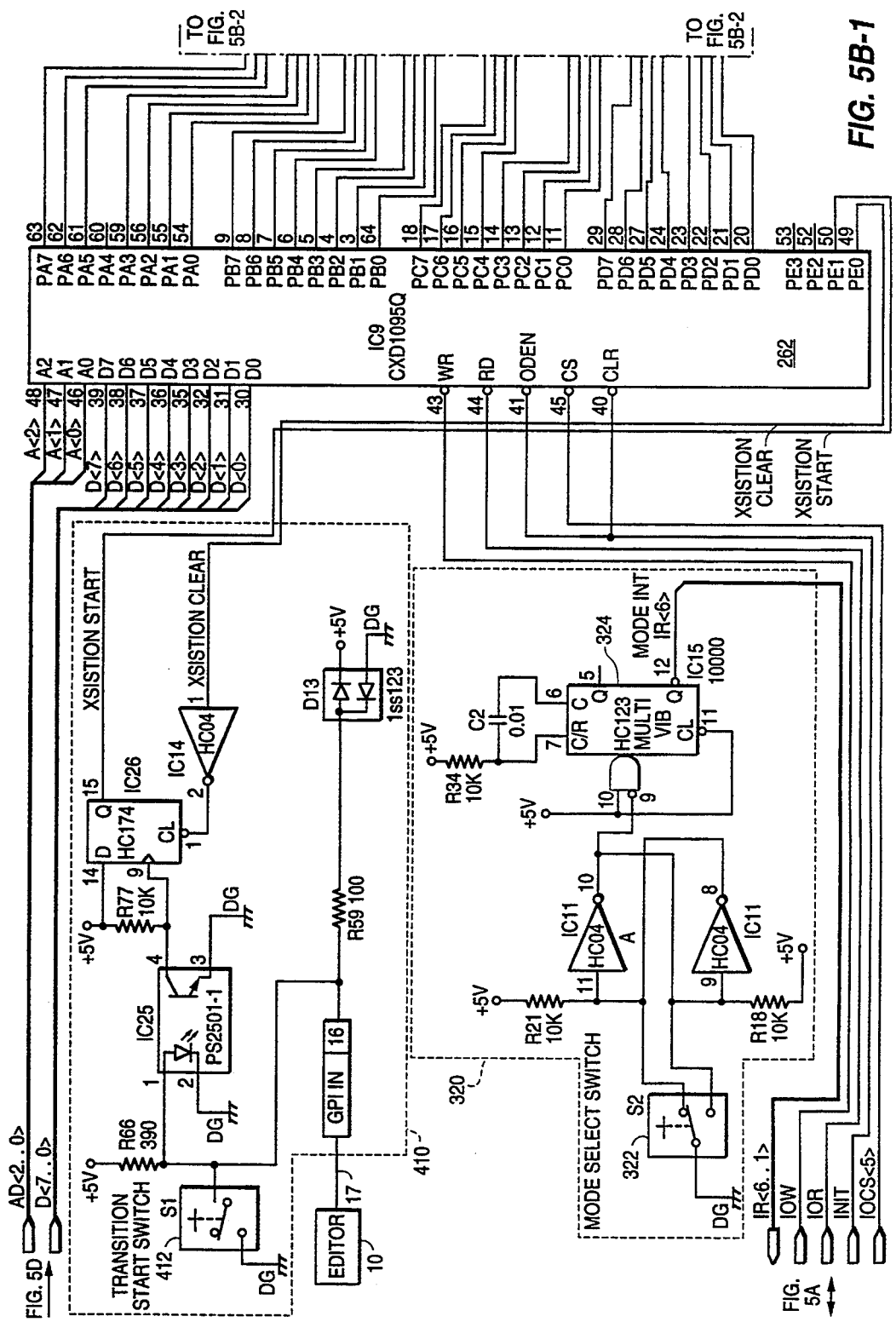
Figures 2, 5B:
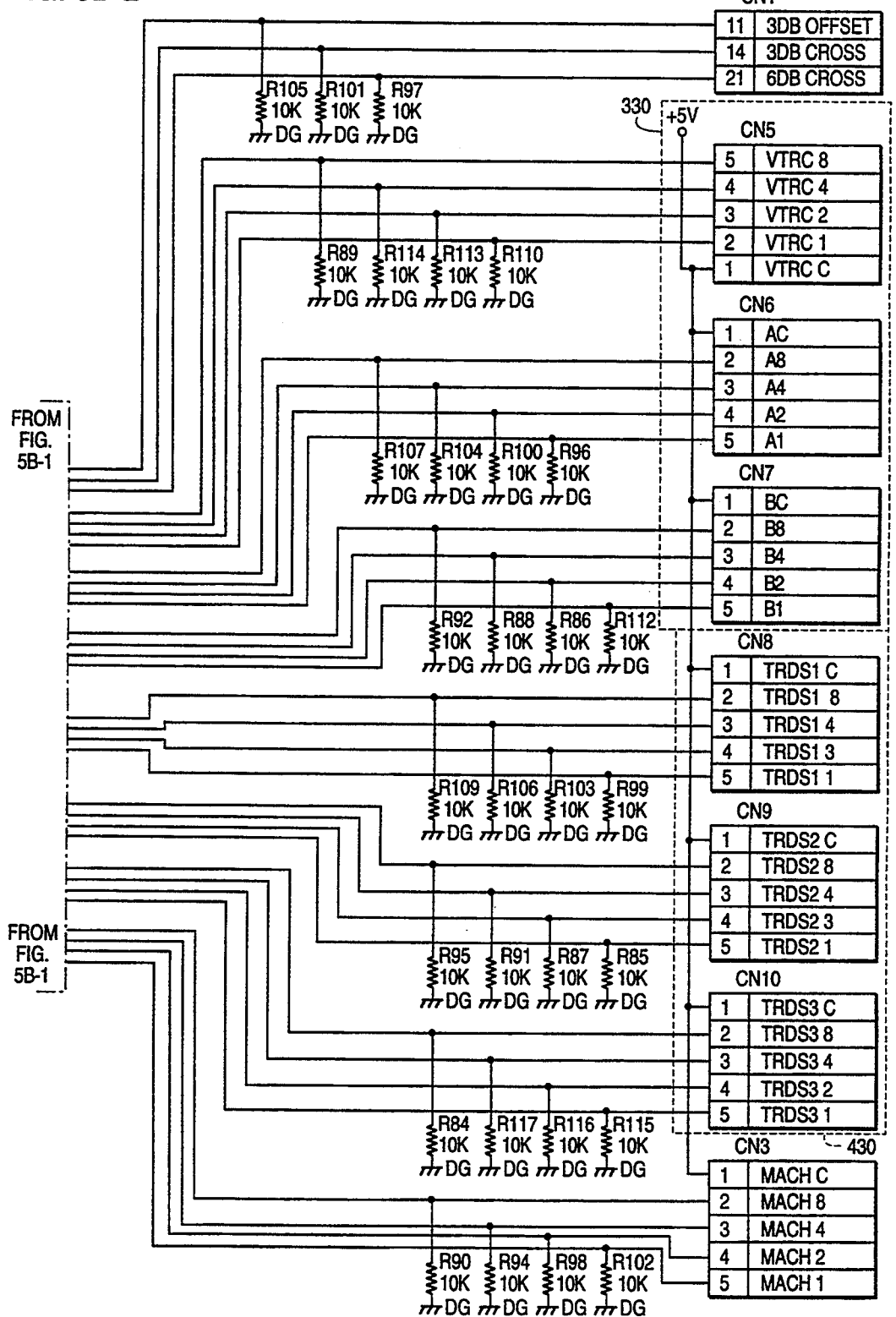
Figures 3, 5B:
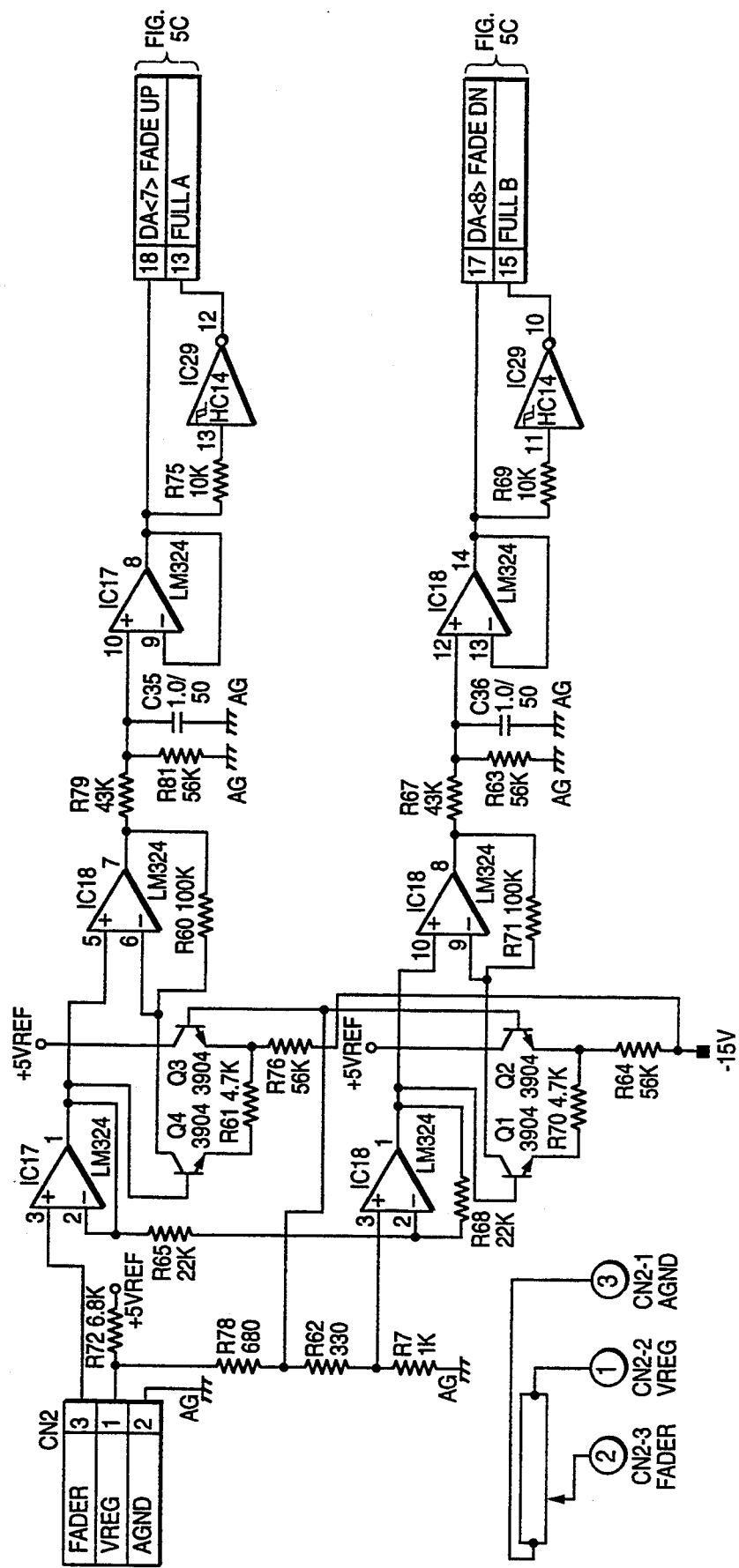
Figures 1, 5C:
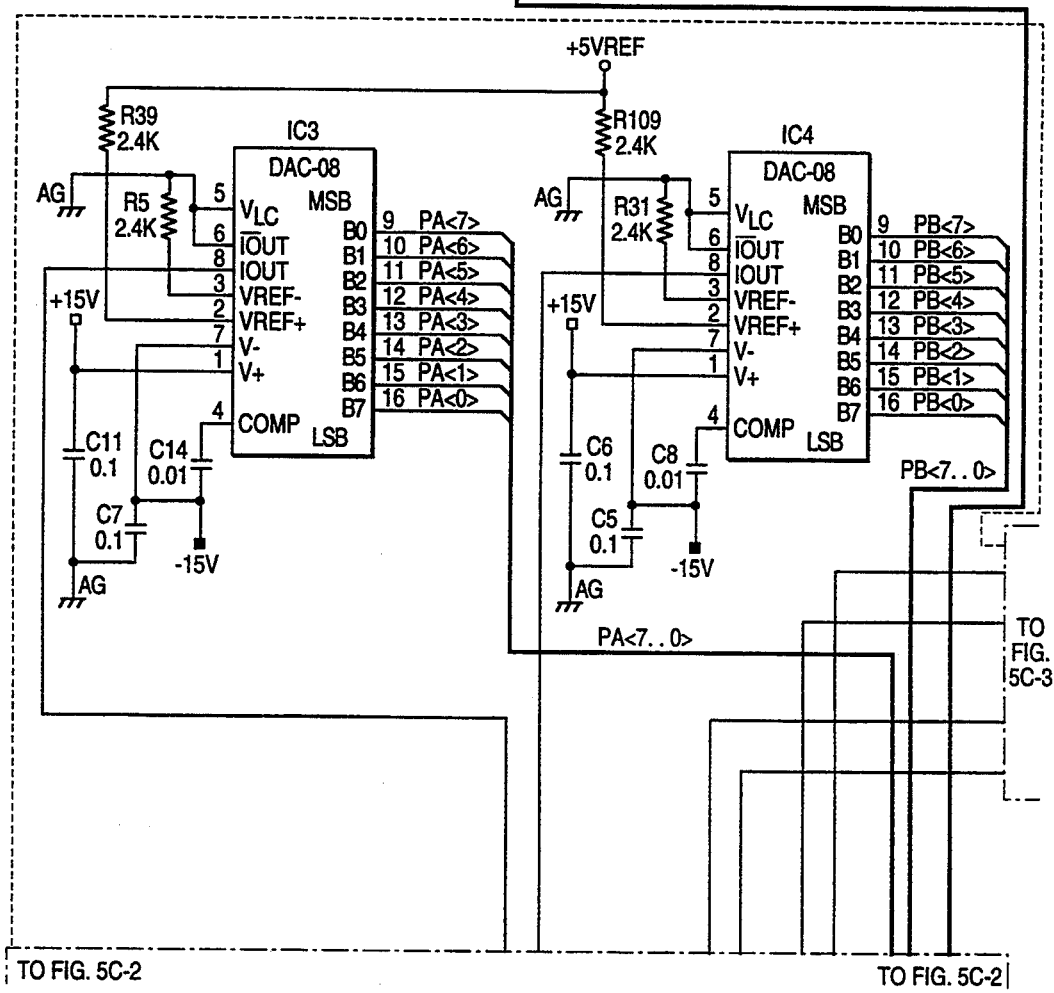
Figures 2, 5C:
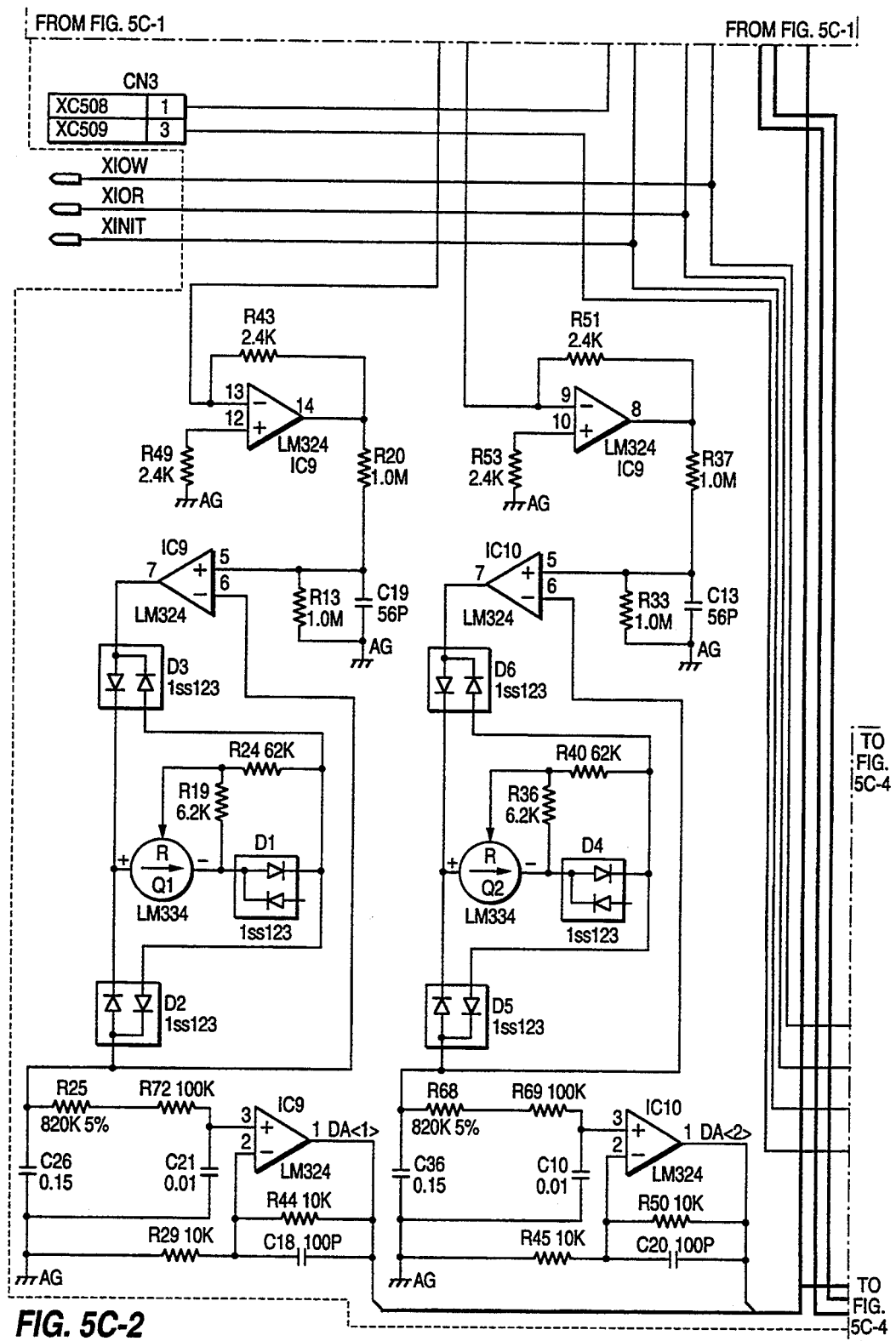
Figures 3, 5C:
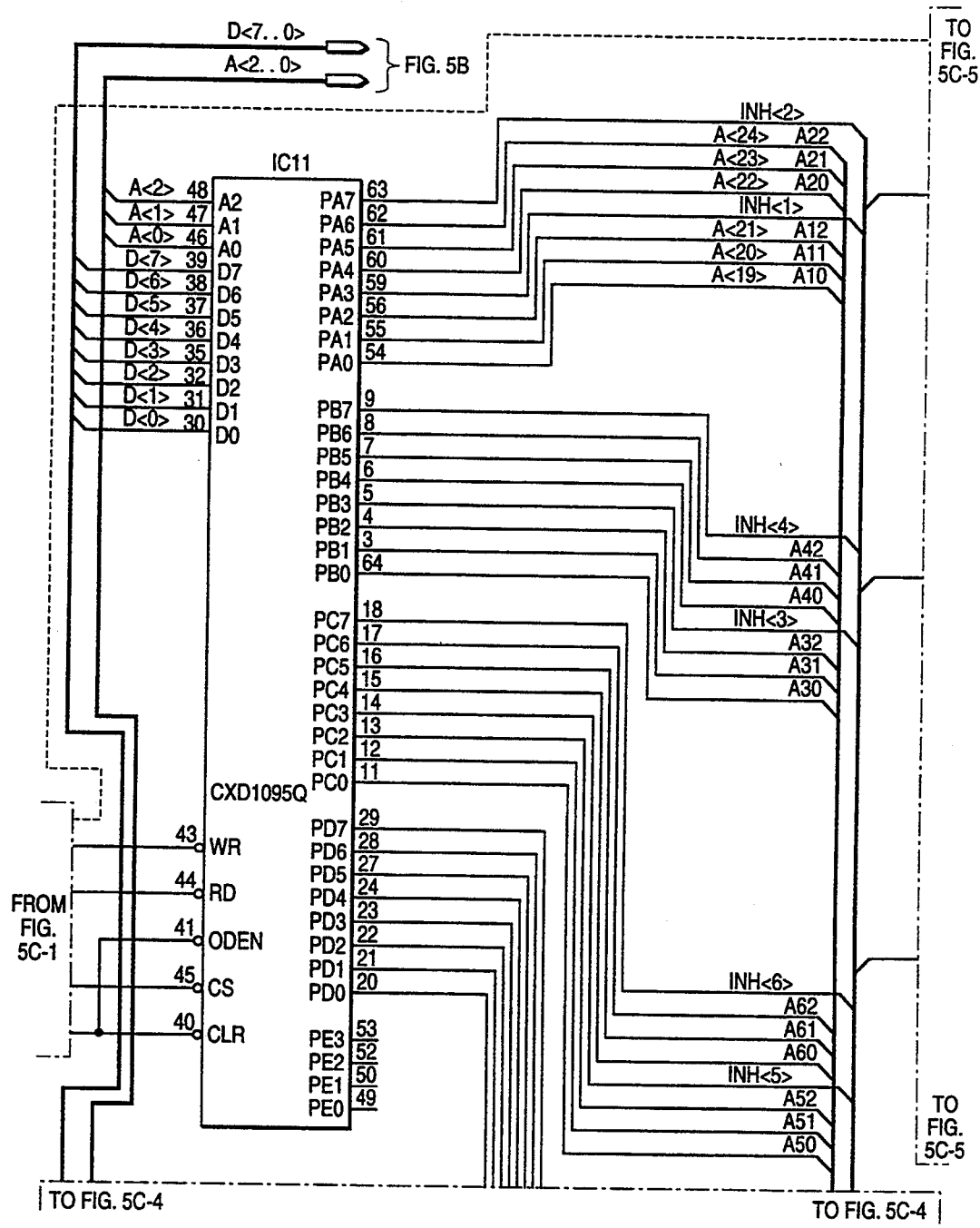
Figures 5, 5C:
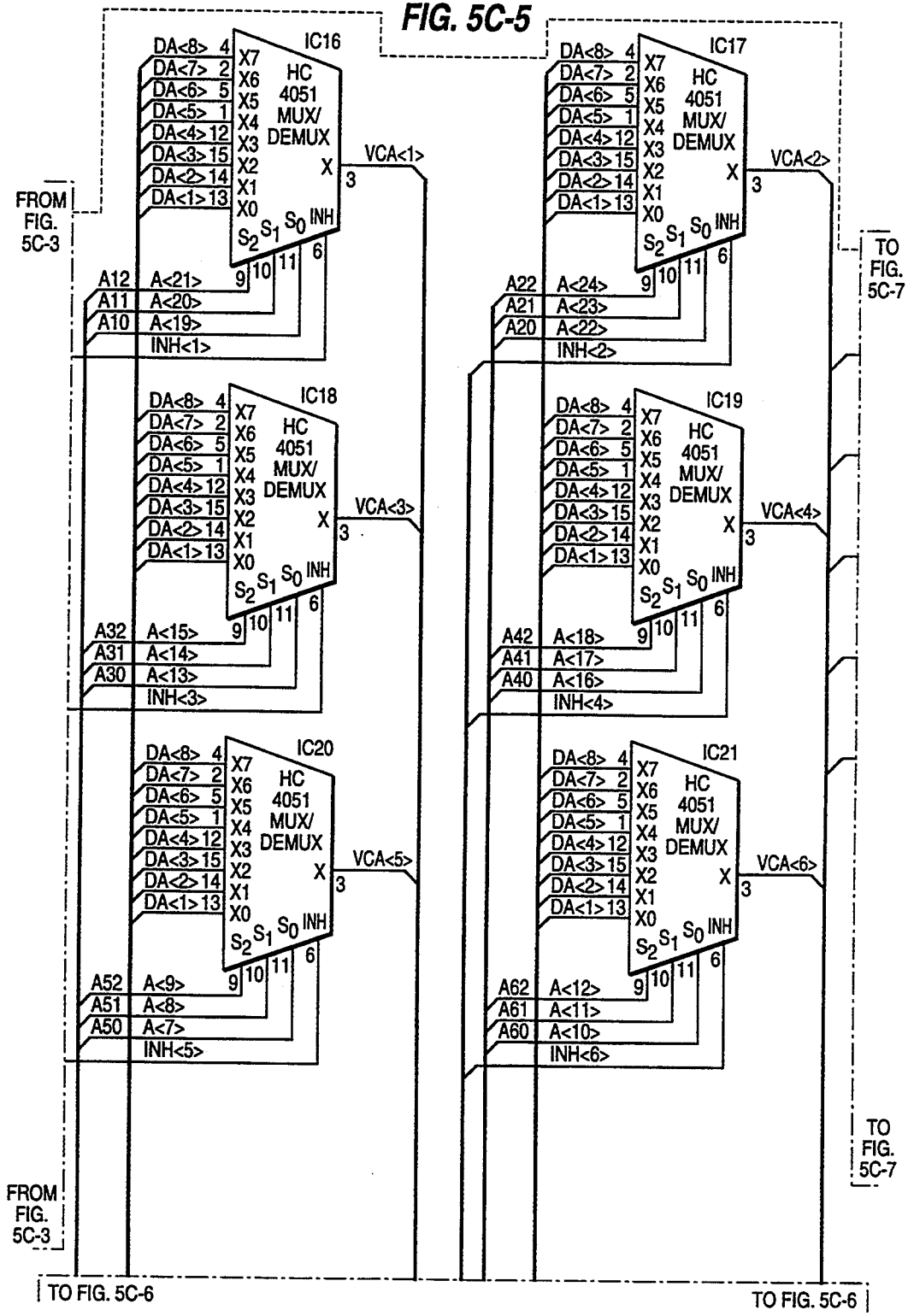
Figures 5, 5C, 6:
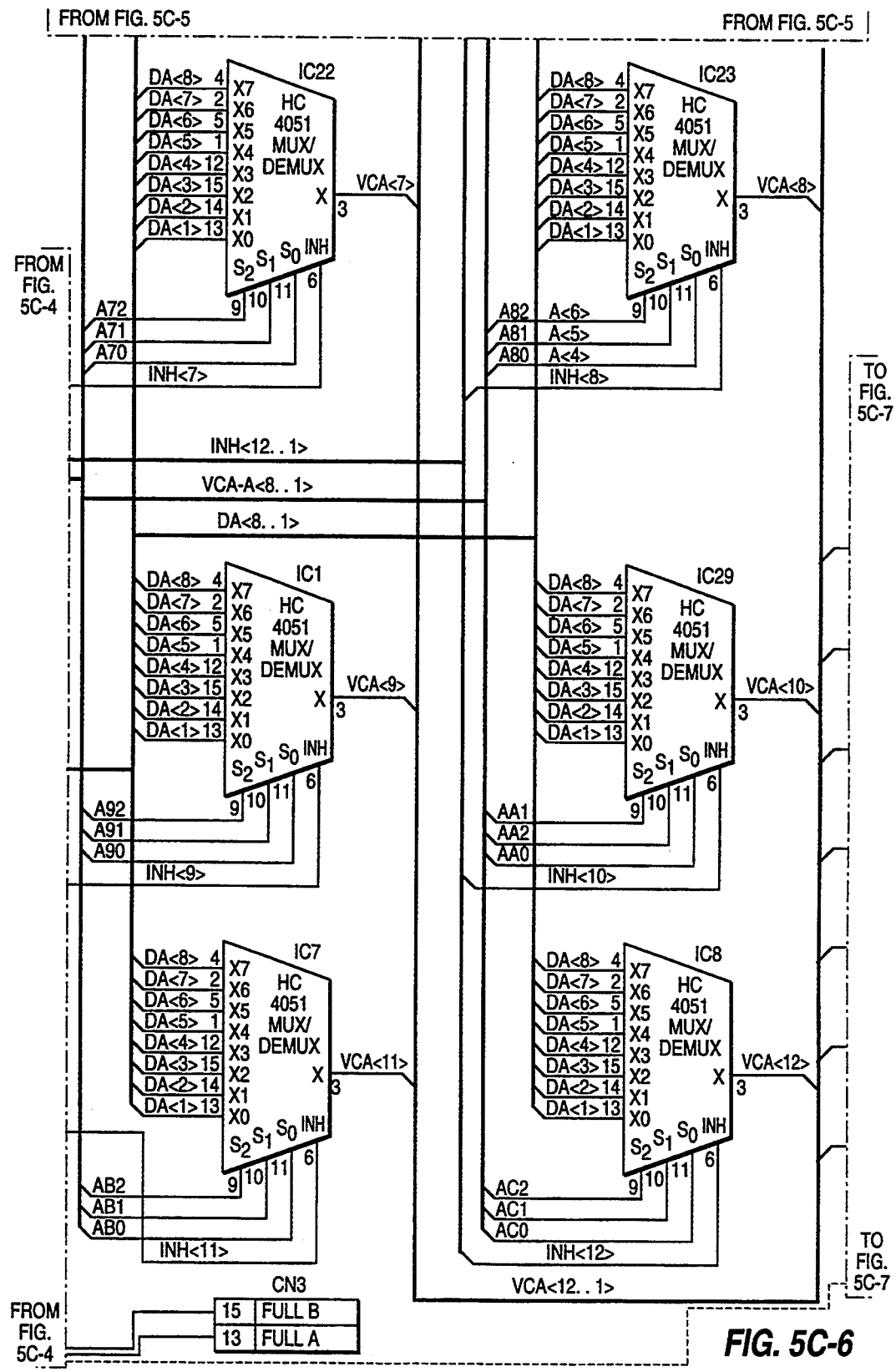
Figures 5, 5C, 6, 7:
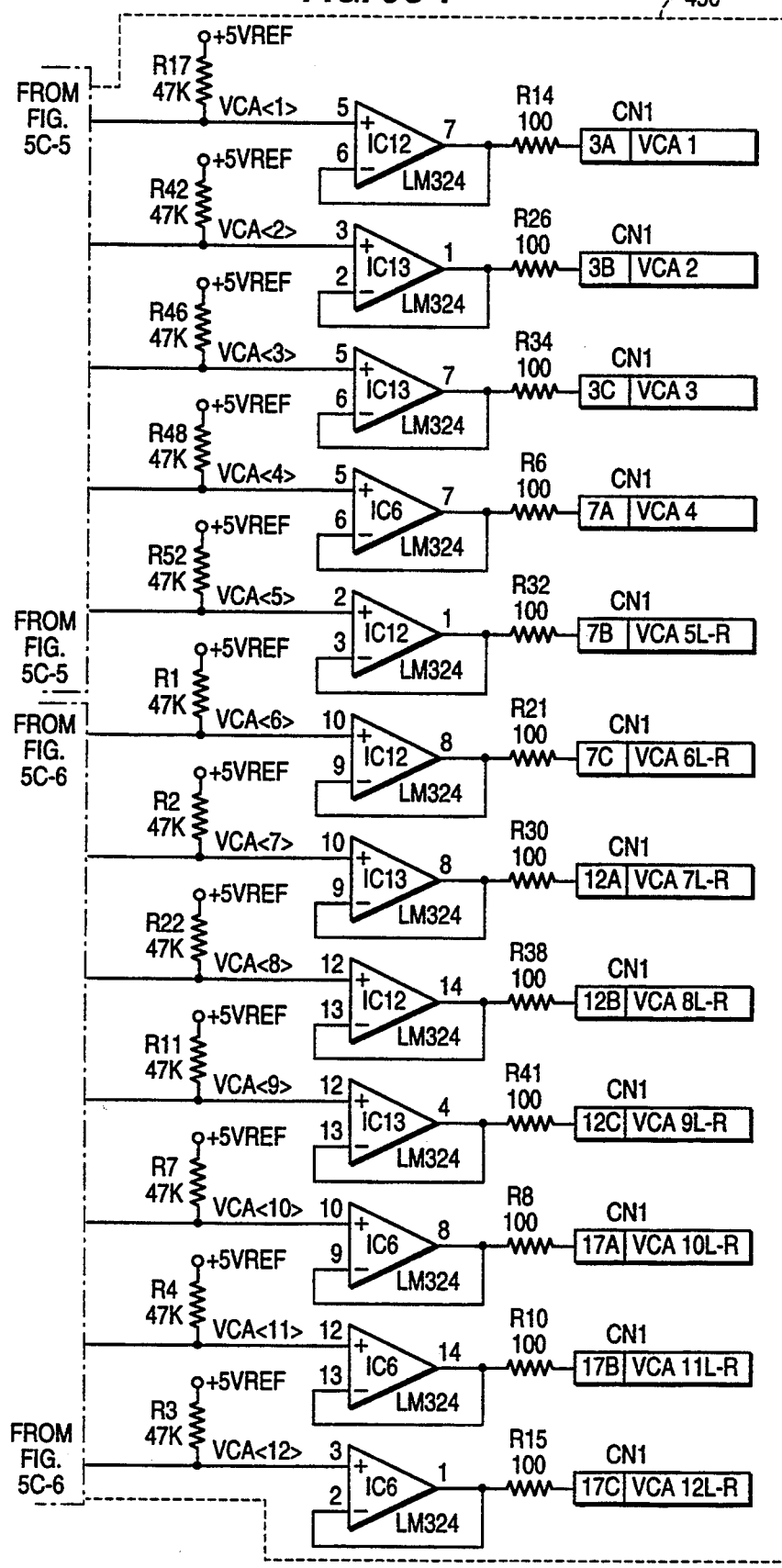
Figures 1, 5D:
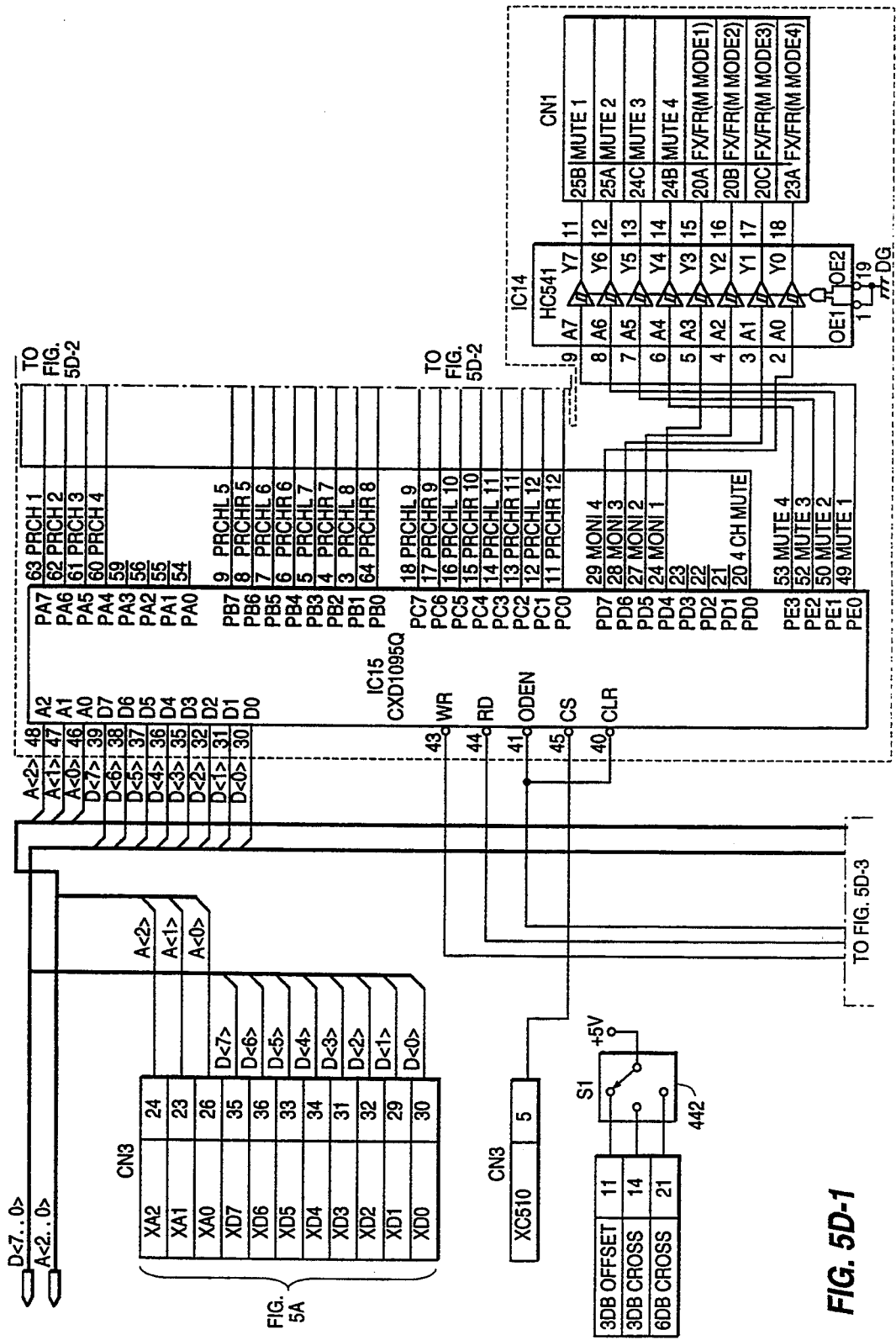
Figures 2, 5D:
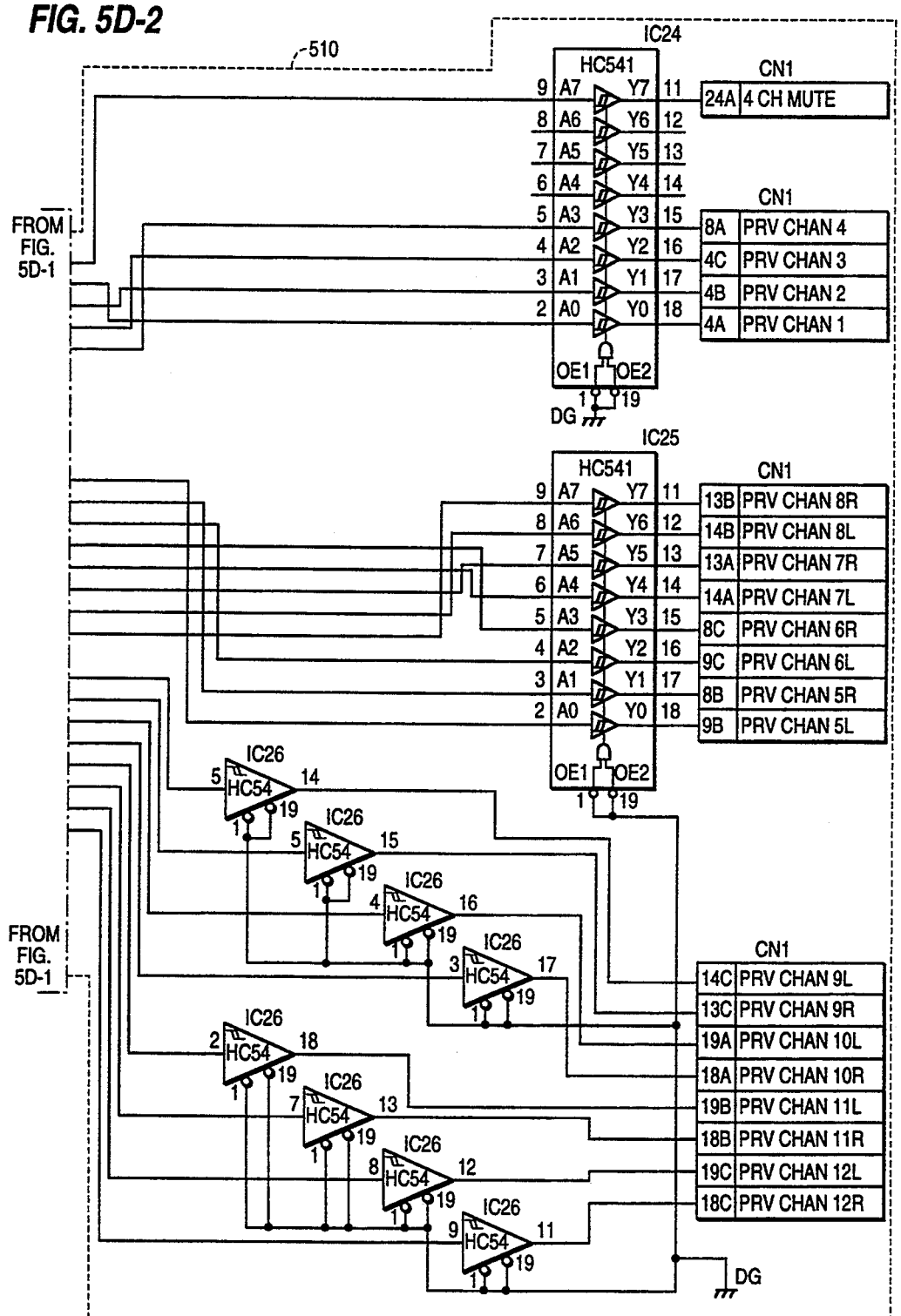
Figures 3, 5D:
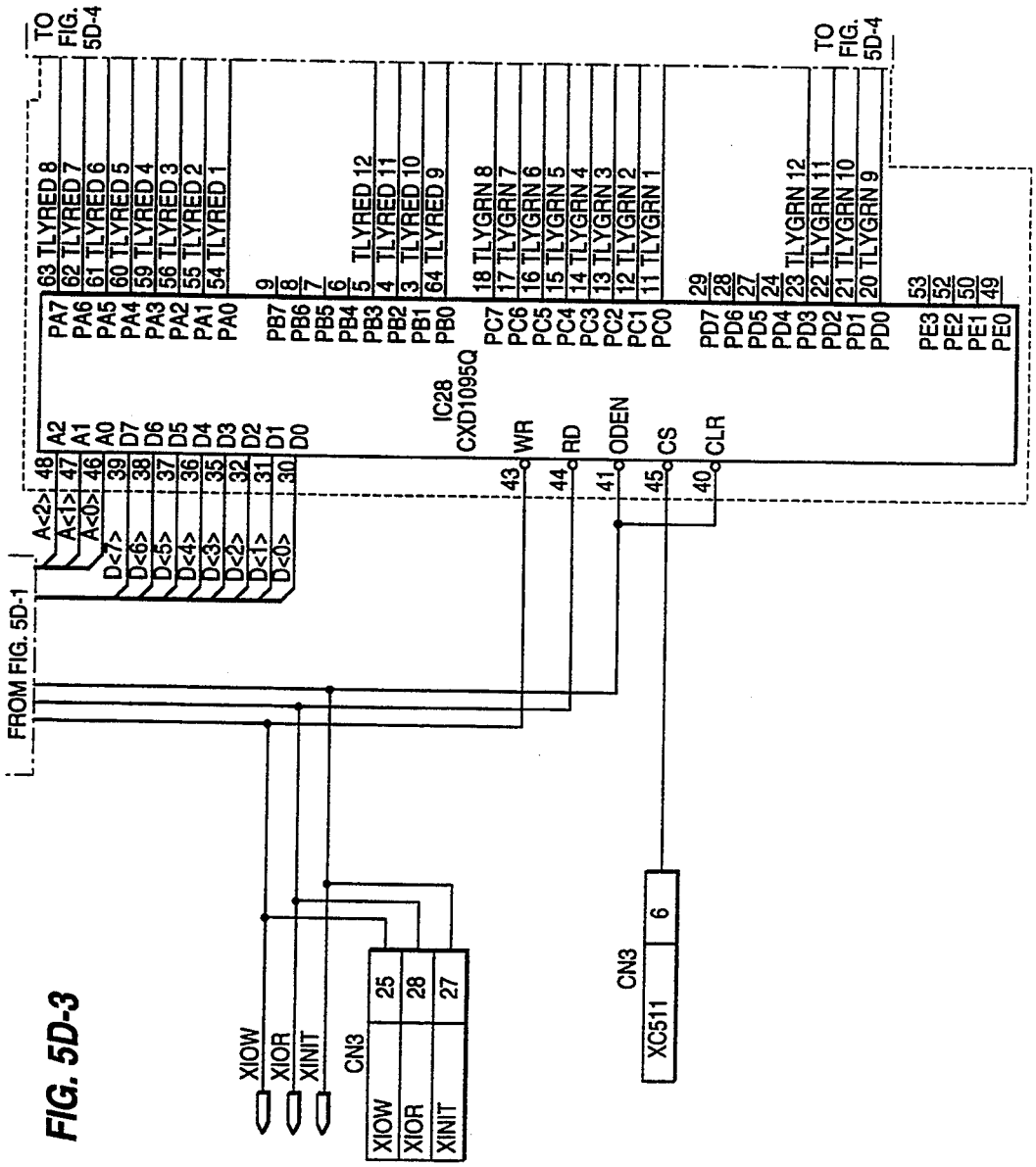
Figures 4, 5D:
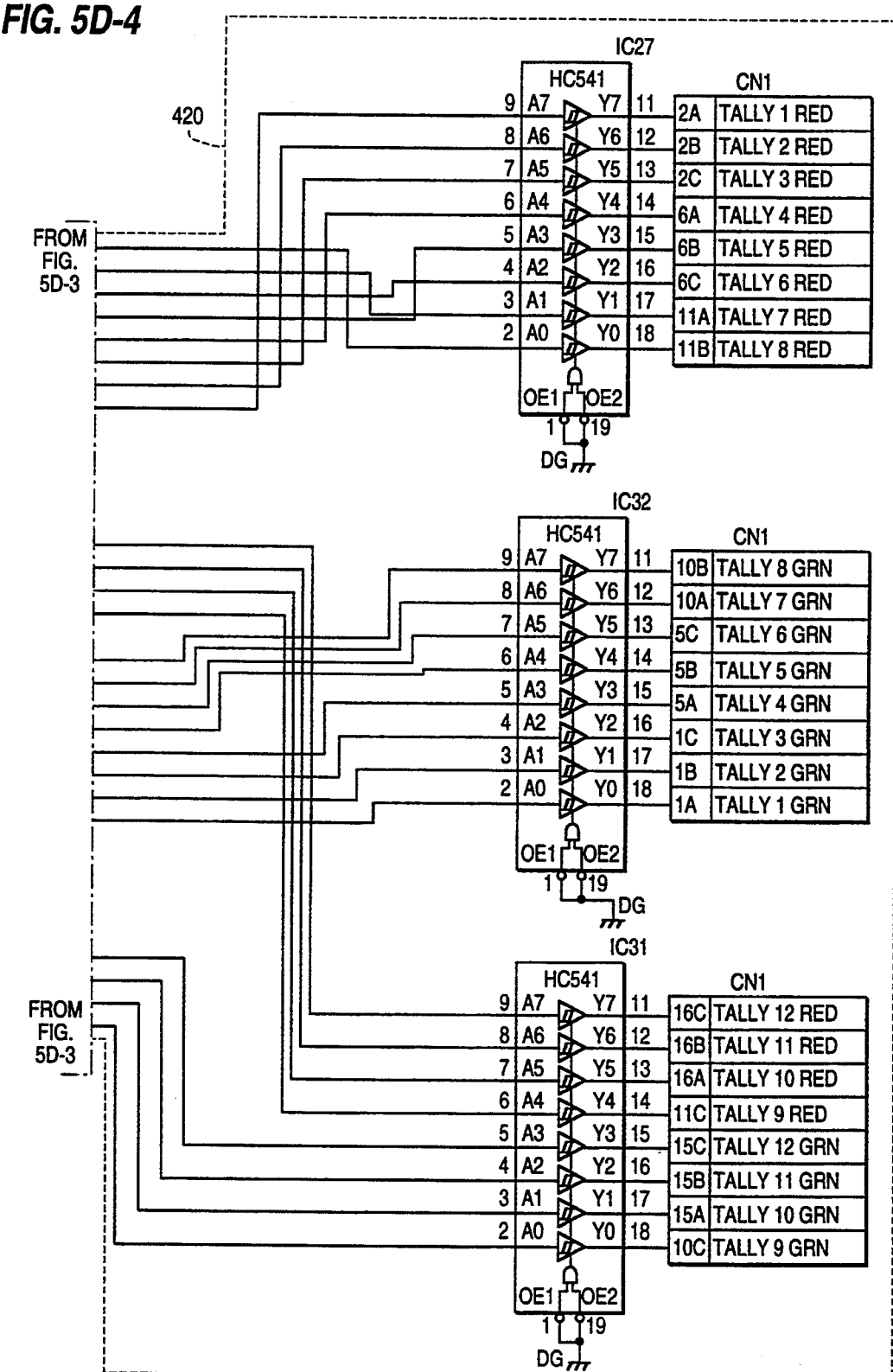

Signals from the microprocessor 230 and the communications IC 210 are routed to the circuits of FIGS. 5B and 5D as shown.

The circuits shown in FIGS. 5B-1 to 5B-3 control VTR selection, PREVIEW control, crossfade initiation and mode selection. Accordingly, data from the microprocessor shown in FIG. 5A is routed to an integrated circuit 263. The data is fanned out to provide VTR selection as well as crossfade duration control data. Further shown, is crossfade start circuit 410 which initiates crossfading through either a signal provided by the editor 17 or manually through switch 412. Additionally, there is provided a mode select switch 322 coupled to a multivibrator 324 for enabling editor control of the mixer.

FIGS. 5C-1 to 5C-7 illustrate an arrangement for providing a VCA output signals which control the various channels in the mixer corresponding to the VTR configuration. Accordingly, control data from the microprocessor is used to control a plurality of multiplexers coupled to the VTR channels in the mixer.

FIGS. 5D-1 to 5D-4 illustrate an arrangement used to provide monitor signals to a preview bus according to control signals supplied from the microprocessor 230. There is also provided a crossfade indicator for providing signals to a plurality of indicator LEDs. These LEDs (not shown) have three states, unlit, green, and red for indicating the status of a selected VTR. That is, when the corresponding LED is unlit, the VTR is not selected. However, when the corresponding LED is green, the LED indicates that the corresponding VTR will receive a signal after a crossfade has occurred. A red LED indicates that a corresponding VTR channel is active, i.e., selected for crossfading.

Also shown in FIG. 5D-1 is a switch 442 which indicates the curve shape of the crossfade to be implemented through the multiplexers shown in FIGS. 5C-5 and 5C-6.

FIG. 6 is a VTR configuration chart illustrating various configurations of VTRs and a corresponding Mode number for each such configuration, similar to FIG. 3 of U.S. Pat. No. 5,175,771, except that FIG. 6 is an expanded, improved version of such configuration selection chart. Thus, the configuration chart has 16 configurations and 12 channels. The configuration selector 30 enables a configuration selection which corresponds to a selected configuration available from the chart. Then, the operator may select the audio from selected VTRs and monitor channels associated with the selected VTRs.

The foregoing is a detailed description of the preferred embodiments. The scope of the invention, however, is not so limited. Various alternatives will be readily apparent to one of ordinary skill in the art. The invention is only limited by the claims appended hereto.

We claim:

1. An audio mixer system comprising:
   means for processing audio signals from a plurality of devices according to one of a plurality of functions;
   an editor operatively connected with said processing means for supplying editor control signals indicating which of said audio signals are to be processed, and the function according to which said audio signals are to be processed by said processing means;
   configuration selection means for enabling selection of a desired configuration of said plurality of devices and for producing configuration selection signals corresponding to a selected configuration; and
   microprocessor control means for controlling said processing of the audio signals from the selected plurality of devices according to control signals obtained from said editor control signals and said configuration selection signals.

2. The audio mixer system of claim 1 wherein said plurality of devices comprise multiple channel VTRs.

3. The audio mixer system of claim 2 wherein said plurality of multiple channel VTRs includes a combination of two and four-channel VTRs.

4. The audio mixer of claim 3 wherein said combination comprises one of 16 preprogrammed configurations.

5. The audio mixer of claim 4 wherein said 16 preprogrammed configurations each comprise different combinations of four single audio channels and eight dual audio channels.

6. The audio mixer of claim 4 wherein said preprogrammed configurations are stored in non-volatile memory coupled to said microprocessor control means.

7. The audio mixer system of claim 1 wherein said processing means implements crossfading of said audio signals.

8. The audio mixer of claim 1 wherein said plurality of functions includes PREVIEW, REVIEW, and crossfade functions.

9. The audio mixer of claim 1, further comprising interface means for providing said editor control signals from said editor to said microprocessor control means.

10. The audio mixer of claim 9, wherein said interface means successively transmits said editor control signals in a serial format, converts said editor control signals from said serial format to a parallel format, and transmits said editor control signals in said parallel format to said microprocessor control means.

11. The audio mixer of claim 10, wherein said interface means includes a communications integrated circuit.

12. The audio mixer of claim 1, wherein said processing means, said configuration selections means, and said microprocessor control means are contained together in a mixer unit.

13. The audio mixer of claim 1, wherein said configuration selection means includes a configuration select member.

14. The audio mixer of claim 13, wherein said configuration select member is operable to toggle through a plurality of preprogrammed configuration schemes stored in nonvolatile memory, said nonvolatile memory being coupled with said microprocessor control means.

15. The audio mixer system of claim 1, wherein said editor is a video editor.

* * * * *